Feb. 11, 1969  E. B. DONNER  3,426,884
GLASS BOTTLE HANDLING APPARATUS
Filed Aug. 15, 1967  Sheet 1 of 8

INVENTOR.
Edmund B. Donner
BY
Wood, Herron & Evans
ATTORNEYS

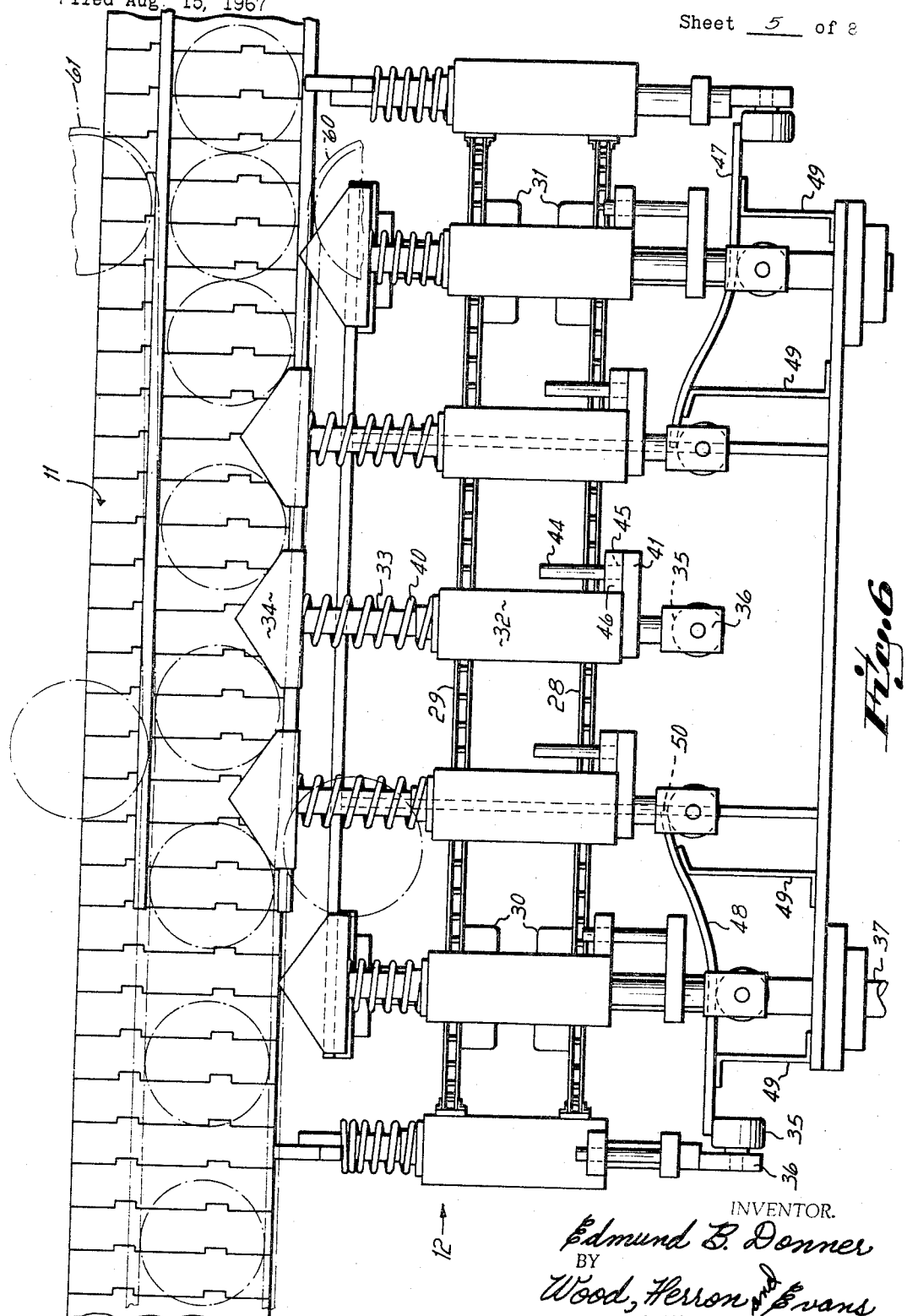

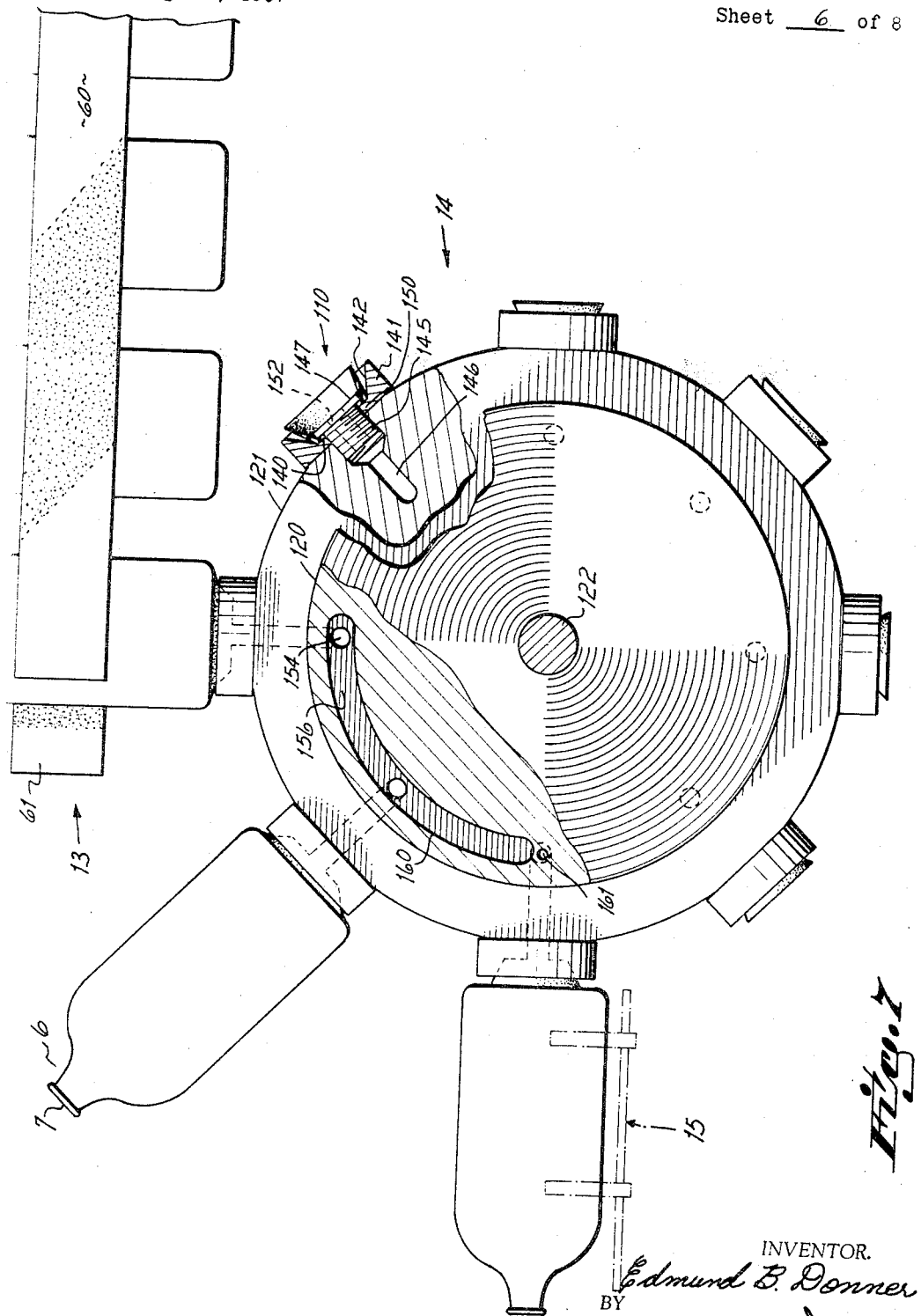

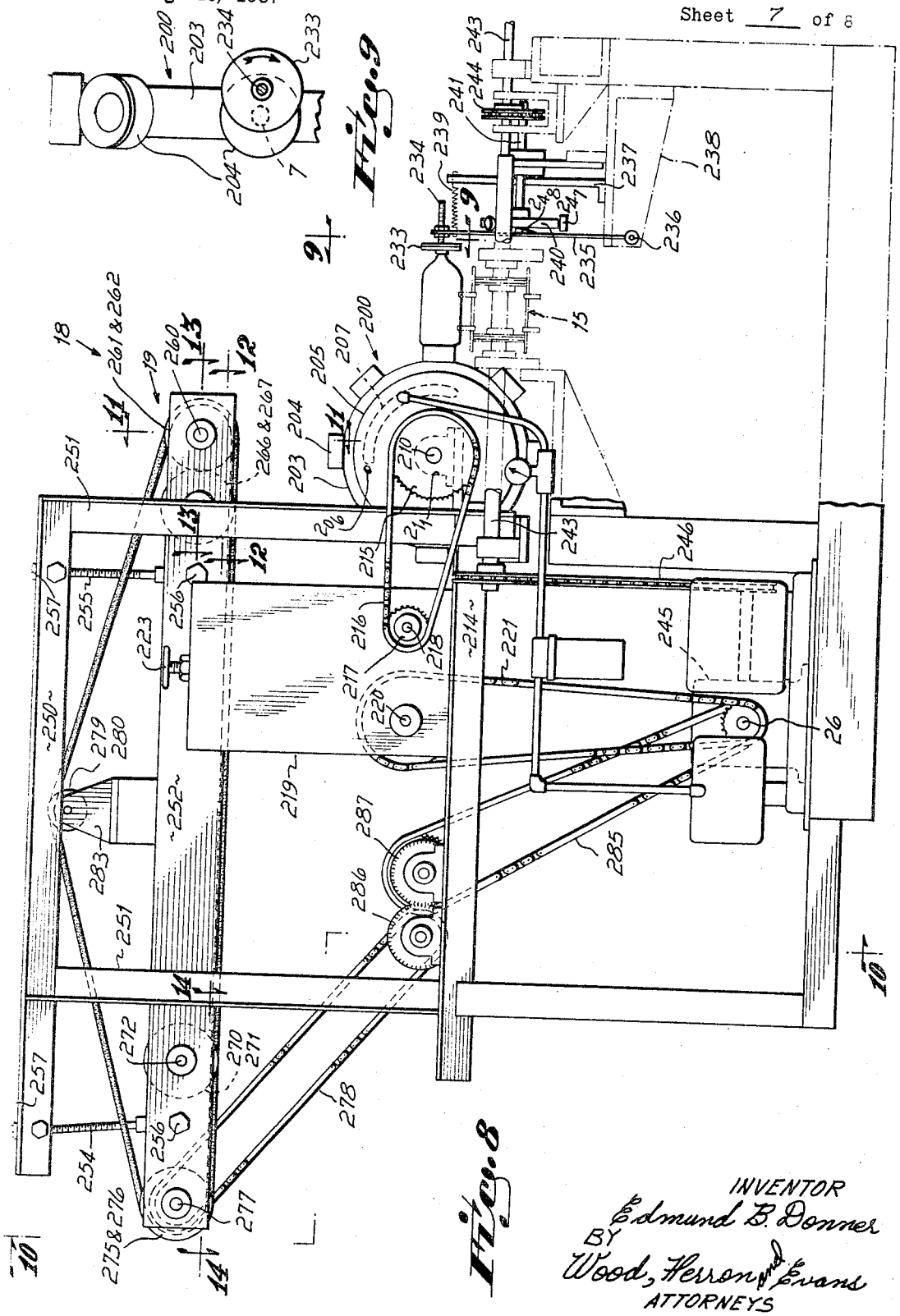

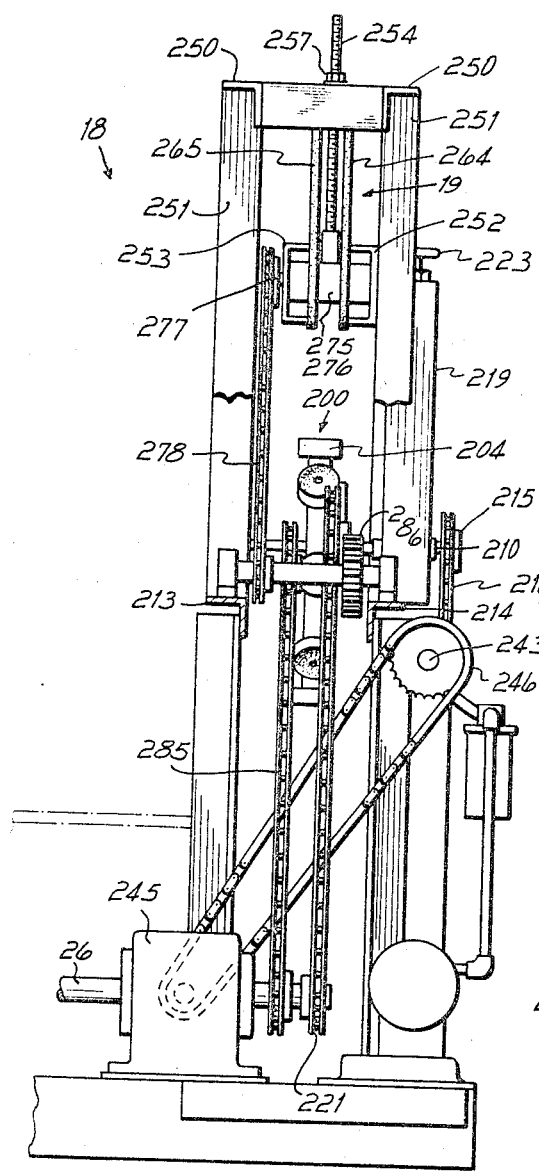
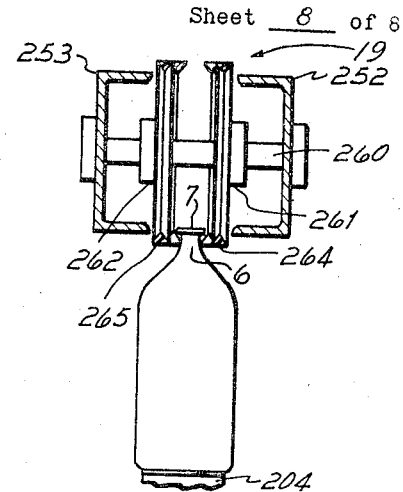
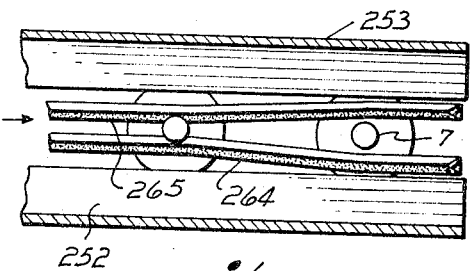
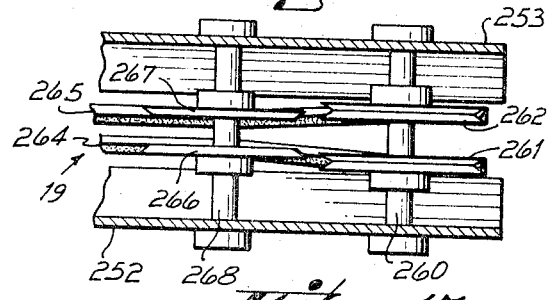
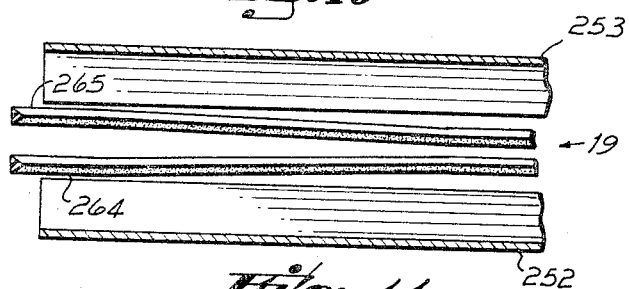

United States Patent Office 3,426,884
Patented Feb. 11, 1969

3,426,884
GLASS BOTTLE HANDLING APPARATUS
Edmund B. Donner, Washington, Pa., assignor to Solar Engineering & Equipment Co., Beaver, Pa., a corporation of Pennsylvania
Filed Aug. 15, 1967, Ser. No. 660,760
U.S. Cl. 198—33
Int. Cl. B65g 47/24, 47/52
15 Claims

ABSTRACT OF THE DISCLOSURE

An input and output bottle handling mechanism for a glass decorating machine. The mechanism is operable to transfer bottles from one transport conveyor to another while rotating the bottles ninety degrees so as to change the orientation of the bottles from a vertically upstanding position to a horizontal position. The transfer occurs as a consequence of the bottles being moved off of a first conveyor onto suction cups of a continuously rotating transfer wheel which then transports the bottles through a ninety degree arc to a second conveyor.

Cross reference to related applications

The glass bottle handling mechanism of this invention is used to feed bottles into and out of a glass bottle decorating machine which is the subject matter of a separate application being filed concurrently herewith and assigned to the assignee of this application. While this invention is particularly well suited for use with that machine, it is also suitable for application to other types of bottle decorating machines which require reorientation of the bottles at the infeed and output ends of the machine.

Background of the invention

In the course of automating and increasing the speed of production of glass bottles, the speed of operation of the bottle decorating machines has had to be increased markedly. Consequently, prior art bottle handling mechanism and apparatus have become obsolete because of the inability of these mechanisms to effect high speed transfer and reorientation of the bottles into and out of the machine. Specifically, the standard technique of dropping bottles off of an infeed conveyor onto an oscillating cradle which then lowers the bottles onto the decorating machine conveyor has become obsolete because of the slow acceleration rate of a falling bottle and the excessive machine breakdown associated with a high speed oscillating cradle. Additionally, the oscillating cradle results in an excessive rate of breakage of bottles when operated at high speeds, as for example 250 to 400 bottles per minute.

Summary of the invention

The primary objective of the invention has therefore been to provide a new and improved high speed bottle handling mechanism for transferring bottles from an infeed conveyor to a conveyor of a bottle decorating machine or from a conveyor of a bottle decorating machine to an output conveyor while effecting a ninety degree reorientation of the bottles. To this end, the bottle handling mechanism of this invention comprises a continuously rotating wheel having a plurality of suction cups located on its periphery and positioned between the two conveyors between which it effects the transfer. A plurality of suction cups are mounted upon the periphery of the wheel and are engageable with the bottoms of bottles as the bottles move off the first conveyor and onto the transfer wheel. A tapping mechanism pushes the bottles into engagement with the suction cups simultaneously with the arrival of the bottles over the cups and the application of a vacuum to the interior of the cups. This vacuum is then maintained as the wheel rotates through ninety degrees and drops the bottles onto the horizontal conveyor or at the output end of the machine, lifts the horizontal bottles into the vertical position for transport out of the machine.

These and other objects and advantages of the invention will be more readily apparent from the following description of the drawings in which:

FIGURE 6 is a top plan view of the bottle spacing conveyor taken along line 6—6 of FIGURE 2.

FIGURE 7 is enlarged side elevational view, partially broken away, of the bottle vacuum let down wheel assembly.

FIGURE 8 is a side elevational view of the bottle handling pickup mechanism.

FIGURE 9 is a front elevational view of a bottle pusher portion of the mechanism taken along line 9—9 of FIGURE 8.

FIGURE 10 is a rear elevational view, partially in cross section, of the bottle pickup mechanism taken along line 10—10 of FIGURE 8.

FIGURE 11 is a vertical cross-sectional view of the bottle take out conveyor taken along line 11—11 of FIGURE 8.

FIGURE 12 is a top plan view of a portion of the bottle take out conveyor taken along line 12—12 of FIGURE 8.

FIGURE 13 is another view of the portion of the bottle take out conveyor illustrated in FIGURE 12 but taken along line 13—13 of FIGURE 8.

FIGURE 14 is a top plan view of a third portion of the bottle take out belt conveyor taken along line 14—14 of FIGURE 8.

Figure 1:
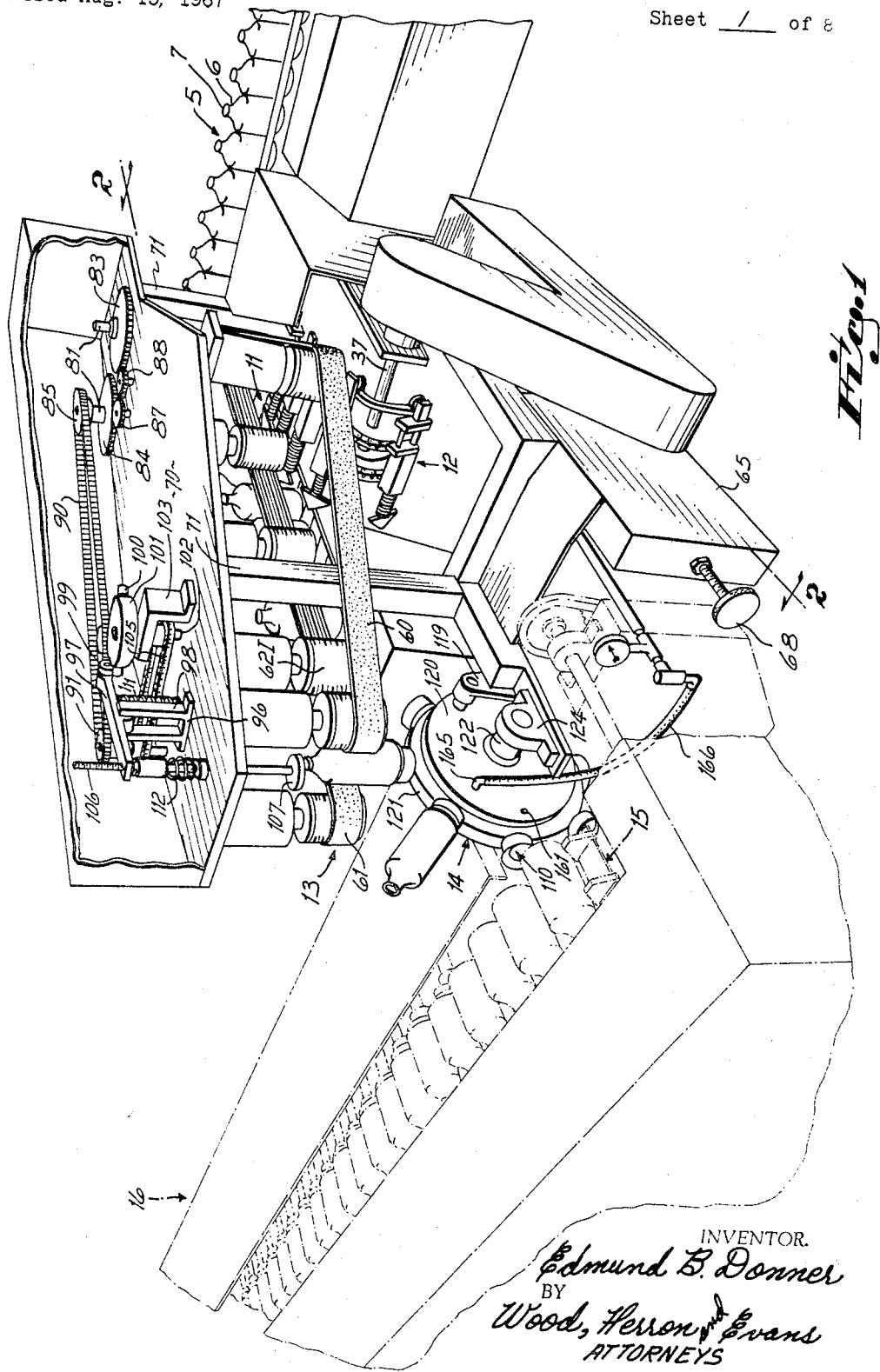
FIGURE 1 is a perspective view of a bottle decorating machine, illustrating in solid lines the bottle handling let down mechanism of this invention.

The bottle handling mechanism of this invention comprises two separate mechanisms; (1) a mechanism for lowering bottles into a horizontal position from a vertical position onto a main conveyor of a bottle decorating machine and (2) a similar mechanism for raising bottles from the horizontal position to a vertical position off of the main conveyor of the bottle decorating machine and onto a take out conveyor. In the horizontal position of the bottles, the axes of the bottles are located in a horizontal plane and in the vertical position, the axes of the bottles are in a vertical plane.

Generally, the two mechanisms are very similar in both structure and function. Both incorporate a continuously rotating vacuum wheel having suction cups mounted upon its peripheral surface and engageable with the bottoms of bottles to transport the bottles through a 90° arc to or from a horizontal position on a main conveyor of a bottle decorating machine. Additionally, both transfer bottles between two continuously moving conveyors which transport bottles in mutually perpendicular directions.

Referring first to FIGURES 1 through 7, there is illustrated the bottle let down mechanism of this application. Basically, this mechanism comprises an infeed platform conveyor 11, a spacing conveyor 12, an infeed belt conveyor 13, a let down vacuum wheel 14, and a main conveyor 15 of a bottle decorating machine 16. The decorating machine conveyor 15 serves as the take out conveyor for transporting bottles away from the let down wheel after the bottles have been moved from a vertical to a horizontal position.

While supported in the horizontal position on the main conveyor 15, the bottles are transported through the decorating machine 16 to the bottle pickup mechanism 18 illustrated in FIGURES 8 through 14. This latter mechanism 18 removes the bottles from the main conveyor 15 and transports them to a take out belt conveyor 19. In passing through the machine 16, a decorative medium in a predetermined pattern is applied to the cylindrical portion of the bottles by mechanism which forms no part of the invention of this application and has not, therefore, been illustrated in detail. This decorating mechanism is the subject matter of another application which is being filed concurrently herewith and is assigned to the assignee of this application.

The infeed platform conveyor 11 comprises an endless chain of articulately interconnected plates movable over a drive roll (not shown) at the forward end of the conveyor and an idler roll (not shown) at the rear end of the machine. The drive roll is mounted upon and driven by a drive shaft 20 while the idler roll is rotatably supported upon an idler shaft 21. Both shafts 20, 21 are rotatable within journal blocks of the machine frame 23. Drive shaft 20 is driven by a chain and sprocket drive 24 from a second chain and sprocket drive 25 (FIGURE 2) which is in turn driven directly from the main drive shaft 26 of the decorating machine 16.

A continuous line of bottles 5 is supplied onto the platform conveyor 11. In moving forwardly or downstream on the conveyor 11, the bottles are spaced apart a predetermined distance preparatory to transfer onto the let down wheel 14 and subsequently onto the main conveyor 15 of the machine 16. This spacing is accomplished by the continuously moving spacing conveyor 12.

The spacer conveyor 12 comprises a pair of parallel endless chains 28, 29 driven from a pair of sprockets 30 at the forward end of the conveyor and rotatable over a pair of idler sprockets 31 at the rear of the conveyor. These chains carry a plurality of spacer shaft support sleeves 32 which extend between and are attached to lugs of the chains 28, 29. The sleeves in turn slideably support shafts 33 which extend through center bores of the sleeves. A generally triangularly configurated spacer block 34 is mounted upon the inner end of each of these shafts 33. On the outer end, each shaft carries a roller 35 which is rotatably mounted upon a radially extending support shaft 36. A compression spring 40 located over the shaft 33 between the spacer block 34 and the sleeve 32 biases the shaft and the attached block 34 inwardly to a position over the platform conveyor 11.

To preclude rotation of the shafts 33 about their own axes, each shaft 33 has a flange 41 extending radially from one side. This flange 41 supports a transverse post 44 which extends through an aperture 45 of a lug 46 rigidly attached to each of the sleeves 32. The posts 44 are slideable within the apertures 45 so that the shafts 33 are free for longitudinal movement but are secured against rotation about their own axes.

Figure 2:
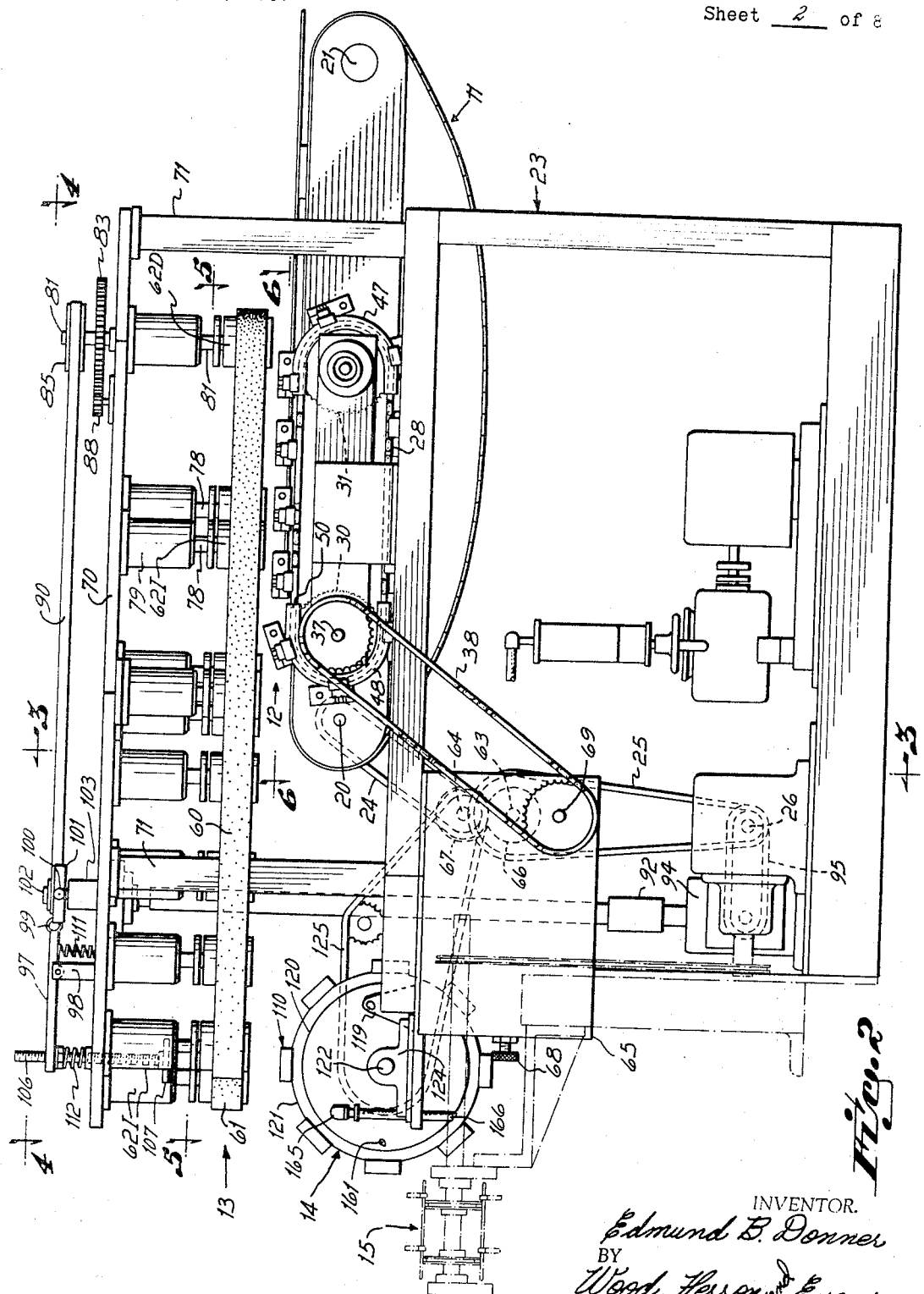
FIGURE 2 is a side elevational view of the bottle handling mechanism taken along line 2—2 of FIGURE 1.

Axial movement of the shafts 33 within the sleeves 32 is controlled by a pair of stationary cams 47, 48. Referring to FIGURES 2 and 6, it will be seen that the cams 47, 48 are generally C-shaped and are fixedly supported by brackets 49 on the machine frame at opposite ends of the conveyor 12. The cams are located in the path of travel of the rollers 35 on the conveyor 12 so as to force the rollers 35 and attached shafts 33 outwardly away from the platform conveyor 11 against the bias of the springs 40. As the shafts 33 and attached rollers 35 pass around the idler sprockets 33 at the upstream end of the conveyor 12, the rollers 35 engage the bottom of the cam 47 and are forced outwardly upon movement up over the cam 47. This results in compression of the springs 40. As the rollers pass over the upper end of the cam, the springs 40 force the shafts 33 inwardly while the rollers move over the inwardly tapered cam surface of cam 47. In moving inwardly, the triangular or wedge shaped blocks 34 on the ends of the shafts 33 move between two adjacent bottles on the platform conveyor 11, thereby causing the two bottles to be pushed apart a predetermined distance. After having properly spaced the bottles and upon continued movement of the wedge shaped blocks 34 downstream, the rollers 35 engage the inwardly tapered upper end 50 of the second cam 48 and are forced outwardly away from the platform conveyor. Consequently, the blocks 34 attached to the inner end of the shafts 33 are pulled outwardly by the cam and are thus withdrawn from between the bottles.

Prior to withdrawal of a wedge block 34 from between two adjacent bottles, the bottles are entrapped between belts 60, 61 of the belt conveyor 13 so that the spacing of the bottles is maintained after withdrawal of the spacing wedges 34.

The drive system to the spacer conveyor 12 is synchronized with movement of the main conveyor 15 of the decorating machine 16. To this end, the conveyor 12 is driven from the main drive shaft 26 of the decorating machine through the chain and sprocket drive 25 to a shaft 63. This shaft 63 drives the input shaft 64 of an adjustable drive unit 65 through a pair of gears 66, 67. The drive unit 65 is a conventional drive system having a control knob 68 which upon rotation changes the angular position of the input shaft relative to the output shaft. A chain and sprocket drive 38 drives the shaft 37 of the conveyor 12 off of the output shaft 69 of the drive unit 65. The drive shaft 37 in turn drives the sprockets 30 which support the forward end of the chains 28, 29 of the spacer conveyor.

The infeed belt conveyor 13 is mounted upon and supported from an overhead support plate 70 which is in turn supported by four vertical frame posts 71. This overhead support plate 70 rotatably supports two series of belt rollers 62, one series for each belt 60, 61. The rearwardmost one 62D of each of these two series of rollers is rotatably driven while the other rollers 62I are all idlers and serve only to guide the belts in their generally triangular path of travel (see Figure 5).

Figure 3:
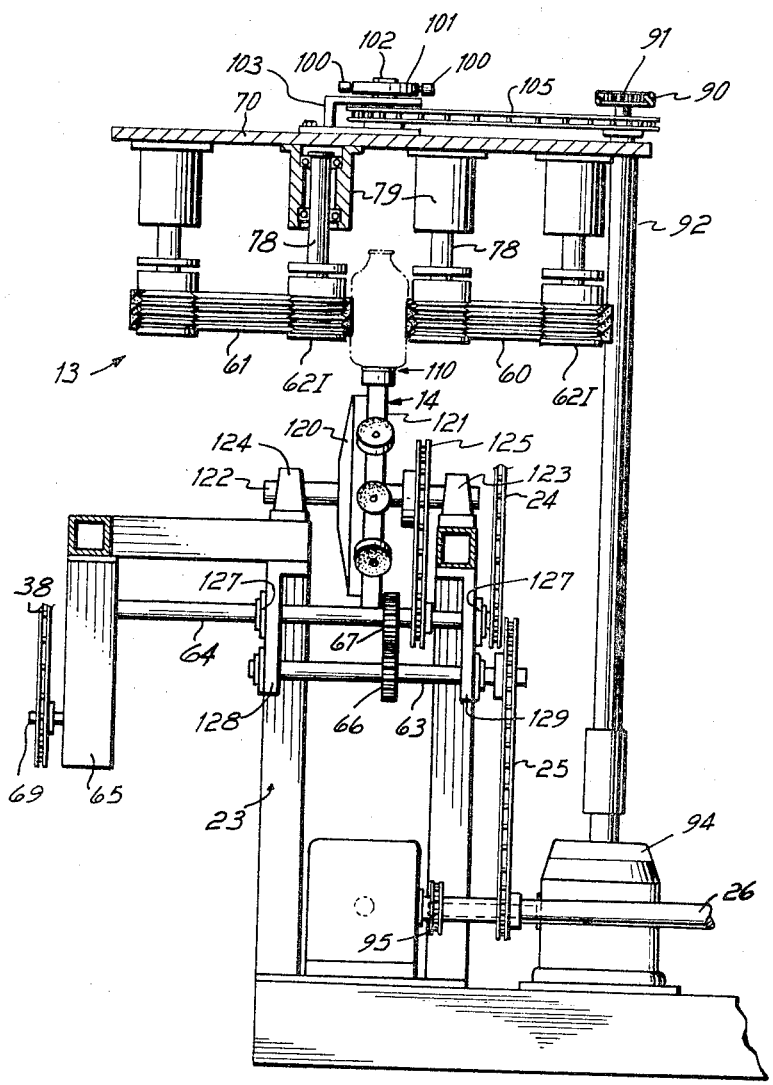
FIGURE 3 is a vertical cross-sectional view of the bottle handling mechanism taken along line 3—3 of FIGURE 2.
Figure 4:
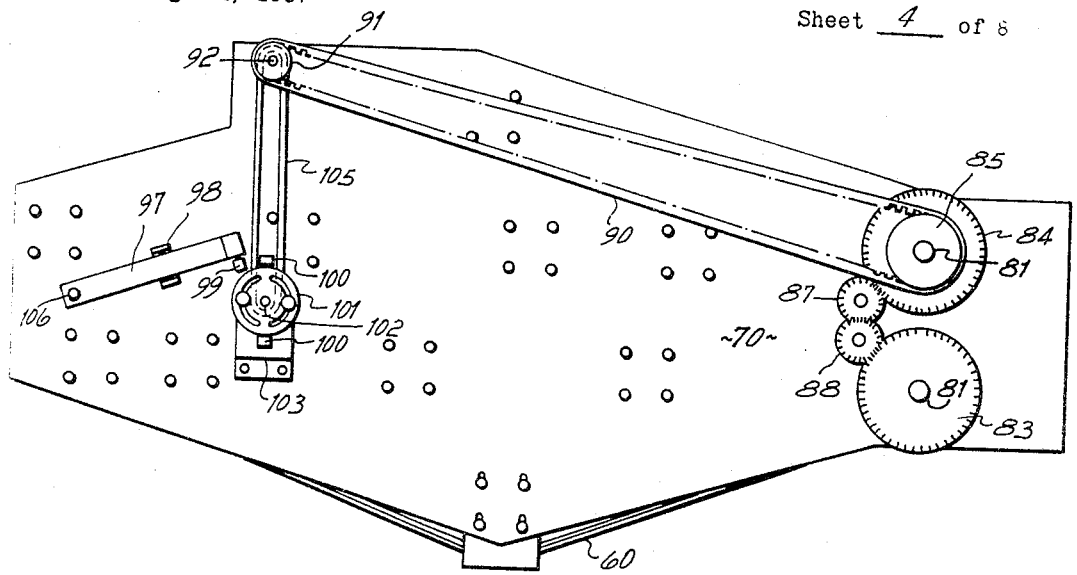
FIGURE 4 is a partially diagramatic top plan view of the bottle handling let down mechanism taken along line 4—4 of FIGURE 2.
Figure 5:
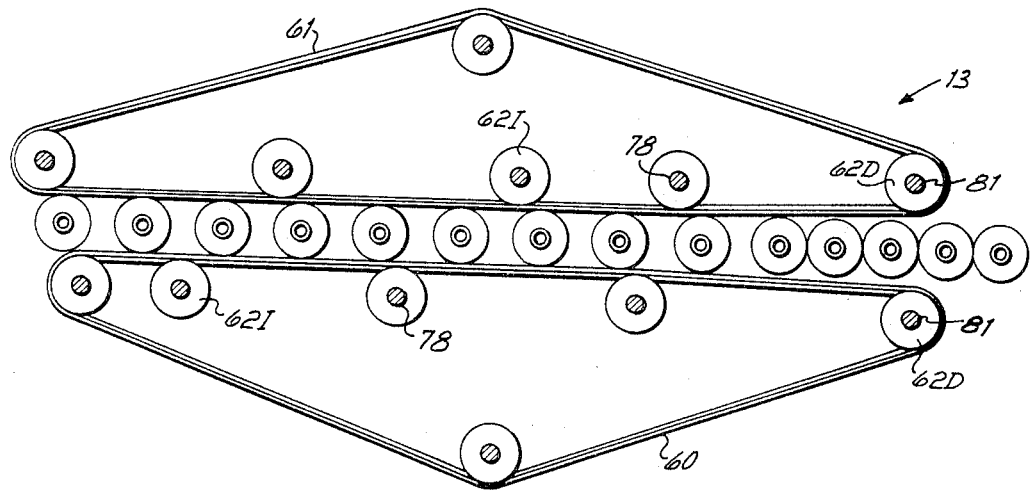
FIGURE 5 is a partially diagramatic cross-sectional view of the infeed belt portion of the bottle let down mechanism taken along line 5—5 of FIGURE 2.

Referring now to FIGURE 3, it will be seen that each of the idler rollers 62I is nonrotatably keyed to a vertical support shaft 78. Each of the shafts 78 is in turn rotatably journalled within a supporting sleeve 79 which is fixedly secured to the bottom of the plate 70.

The two rearwardmost drive rollers 62D are nonrotatably keyed to the supporting drive shafts 81. The shafts 81 both extend upwardly through and above the supporting plate 70. A drive gear 83, 84 is nonrotatably keyed to the upper ends of the two drive shafts 81. Above the gear 84, a drive pulley 85 is nonrotatably secured to one of the two shafts 81. As may be seen most clearly in FIGURE 4, the two gears 83, 84 are interconnected by a pair of rotatably mounted idler pinions 87, 88. Thus, rotation of the pulley 85 results in rotation of both of the shafts 81 and the attached rollers as a consequence of the interconnected drive system through the gears 84, 87, 88, 83.

The drive pulley 85 is driven by a belt 90 which is in turn driven from a pulley 91 keyed to the upper end of a drive shaft 92. The shaft 92 extends vertically downwardly through the supporting frame plate 70 and is driven from the main drive shaft 26 of the decorating machine through a gear box 94 and a chain and sprocket drive 95.

A vertically reciprocal tapper or pusher mechanism is mounted upon the top of the overhead frame support plate 70 and is driven from the vertical drive shaft 92. This tapper mechanism comprises a fulcrum bar 97 pivotally mounted medially of its ends in a generally yoke-shaped bracket 98. The base 96 of this bracket is fixedly secured to the top surface of the plate 70.

At its rearwardmost end, the fulcrum bar 97 rotatably supports a roller 99 engageable by a pair of cams 100 which extend radially from a cam wheel 101. The wheel 101 is nonrotatably keyed to a depending drive shaft 102 and is rotatably supported by a generally Z-shaped bracket 103 fixedly secured to the top of the frame plate 70. A chain and sprocket drive 105 drives the shaft 102 off of the vertical drive shaft 92. Consequently, rotation of the cam wheel 101 is synchronized with rotation of the main drive shaft 26 of the decorating machine 16.

At its forward end, the oscillatable fulcrum bar 97 supports a depending screw 106 which extends through an aperture in the plate 70 and rotatably supports a disc 107 at its bottom end. The disc 107 is engageable with the tops of bottles located over suction cups 110 of the vacuum wheel and is operable to push the bottles downwardly into contact with the cups so as to positively engage the bottles with the cups.

A pair of compression springs, one 111 located between the frame plate 70 and the bottom of the fulcrum bar 97, and the other 112 located over the screw 106 between the plate 70 and the bar 97, bias the fulcrum bar 97 into a horizontal plane. The bar 97 remains in the horizontal plane until one of the two cams 100 of the cam wheel 101 engages the bottom half of the cam roller 99 attached to the fulcrum bar, camming the roller 99 upwardly and the other end of the fulcrum bar downwardly together with the pusher screw 106.

As may be seen most clearly in FIGURE 1, the axis of the screw 106 and of the attached rotatable disc 107 is offset from the axis of the bottles located over the suction cups when the disc is moved downwardly into contact with the bottles. This axial offset between the rotatable disc 107 and the bottles causes the disc 107 to rotate upon engagement with the linearly moving bottle. It has been found that this axial offset and rotatability of the disc precludes the disc from cocking the linearly moving bottles relative to the suction cups. Consequently, the disc does not hinder proper seating of the bottles on the suction cups as it would if the disc did not rotate. This offset orientation of the disc relative to the axes of the bottles and the suction cups is best illustrated in FIGURE 9 where the disc is shown relative to the bottles and cups on the pickup mechanism.

When the bottles are pushed downwardly by the rotatable disc 107 into engagement with a suction cup 110 of the vacuum wheel, vacuum or suction is applied to the cup so that the bottom of the bottle is securely clamped to the rotatable vacuum wheel. As may be seen most clearly in FIGURES 1 and 7, the vacuum wheel 14 comprises a first stationary manifold plate 120 secured by a bracket 119 to the frame 23 for angular adjustment with respect to a juxtapositioned rotatable vacuum cup support wheel 121. The wheel 121 is mounted for rotation upon a drive shaft 122 which extends between a pair of frame journal blocks 123, 124.

Referring to FIGURE 3, it will be seen that the shaft 122 is driven in rotation by a chain and sprocket drive 125 from the shaft 64. This latter shaft 64 is supported for rotation in journals 127 of frame plates 128, 129 and is driven by the gears 66, 67 from the shaft 63. This latter shaft 63 is also journalled for rotation in the frame plates 128, 129, and is driven by the chain and sprocket drive 25 from the main drive shaft 26 of the decorating machine. Because the suction cup support wheel or vacuum wheel is driven from the main shaft of the machine, the drive to the vacuum wheel is synchronized with the drive to all of the conveyors of the decorating machine and the bottle let down mechanism which is driven from this same main drive shaft 26.

Eight equidistantly spaced suction cups 110 are mounted upon the periphery of the rotatable wheel 121. Each of these cups opens outwardly or radially from the wheel and has an inwardly turned flange 140 which is clamped to a supporting sleeve 141 on the periphery of the wheel by a hollow screw 145. The outer face of the sleeves 141 taper inwardly to form a seat 142 for the feathered edge of the suction cups 110. Each of the screws 145 is threaded into a counterbored radial bore 146 of the wheel 121. The head 147 of these screws clamp an inner flange 140 of the resilient suction cup 110 to an inwardly extending flange 150 of the vacuum cup supporting block or sleeve 141. The screws 145 also secure the blocks 141 to the vacuum wheel.

The central bore 152 of the hollow screws 145 connect the interior of the vacuum cups to the radial bores 146 in the wheel. These radial bores 146 are in turn connected to transverse bores 154 which are open to the radial side 156 of the wheel 121. The transverse bores 154 are all located at the same radial distance from the axis of the wheel and are selectively connectable to a vacuum source by an arcuate slot 160 in the inner face of the manifold plate 120. This slot 160 is located against the radial face 156 of the wheel 121 so that a vacuum source connected to the slot is selectively connected to the transverse bores 154 and thus the interconnected suction cups as the bores 154 pass the arcuate slot 160.

A bleed hole 161 is provided below the slot 160 to exhaust the cups to atmosphere. The bleed hole is radially positioned in alignment with the transverse bores 154 of the wheel so that the suction cups are connected to atmosphere upon passing the hole 161.

The arcuate slot 160 extends through an arc of 90° from a position slightly offset from the vertical or 12 o'clock position to a position slightly offset from the horizontal or 9 o'clock position of the manifold plate as viewed in FIGURE 7. The offset is toward the 1 o'clock position from the horizontal plane so that upon counterclockwise rotation of the vacuum wheel 121, the transverse conduits 154 are connected to the vacuum maintained in the arcuate slot 160 just prior to arrival at the vertical position and are disconnected from the vacuum source just prior to arrival in the horizontal plane. The exhaust or bleed port 161 is located at the 9 o'clock position so that the vacuum is released prior to bottle engagement with the main conveyor 15. The critical location of this exhaust port 161 is controlled by angularly positioning the manifold mounting bracket 119 with respect to the frame 23.

A fitting 165 and hose 166 connect the slot 160 of the manifold plate 120 to a vacuum source (not shown) at all times when the machine is operating. Consequently, upon counterclockwise rotation of the vacuum wheel 121 relative to the stationary manifold plate 120, bottles engaged by the vacuum cups are transported through a 90° arc downwardly to a horizontal position while clamped to the vacuum cup 110. The vacuum is released through the bleed hole 161 just prior to arrival of the bottle on the decorating machine conveyor deposited on the conveyor 15 and then transported away from the wheel on the conveyor 15 in a direction parallel to the axis of shaft 122.

*Bottle pickup mechanism*

The bottle pickup mechanism is generally similar to the let down mechanism heretofore described. Principally, it differs in that the vacuum wheel mechanically contacts and picks up a bottle located in the horizontal position and transports it to a vertical position rather than vice versa. Additionally, the bottles are transported away from the vacuum wheel after release of the vacuum by a belt conveyor which differs from the infeed belt conveyor 13 principally in that it contacts the necks of the bottles rather than the cylindrical portion of the bottles.

Referring now to FIGURES 8 through 14, it will be seen that the pickup mechanism 18 is located at the opposite end of the decorating machine 16 from the let down mechanism in a position to receive bottles from the decorating machine conveyor 15. This pickup mechanism 18 comprises a vacuum wheel 200, very nearly identical to the vacuum wheel 14, and the belt conveyor 19 for transporting upright bottles away from the vacuum wheel 200.

The vacuum wheel comprises the vacuum cup supporting rotatable wheel 203 and a stationary manifold plate 205. Eight vacuum cups 204 are mounted on the periphery of the wheel 203. The manifold plate 205 is very nearly identical to the manifold plate 120, but differs from the manifold plate 120 in that the arcuate vacuum slot 207 of the plate 205 extends through an arc of approximately 100° from a position slightly below a radial horizontal line through the plate and slightly beyond a radial vertical line through the plate. A bleed hole 206 identical to the bleed hole 161 of wheel 14 is located at the left of the slot 207 (as viewed in FIGURE 8) for exhausting the cups to atmosphere.

A vacuum is applied to the vacuum cups 204 of the wheel 203 prior to arrival of the cups in a diametral horizontal plane of the wheel and the vacuum is maintained to the cups as they rotate in a counterclockwise direction (as viewed in FIGURE 8) until the cups pass through and beyond a diametral vertical center line of the wheel. The vacuum is released just after the cups pass through the vertical center line of the wheel when the transverse apertures 154 of the wheel 203 pass out of communication with the arcuate stationary slot 207 and become aligned with the bleed hole 206 to exhaust the vacuum to atmosphere.

The vacuum wheel 200 is drivingly keyed to and supported from a drive shaft 210. This shaft extends between and is journalled within blocks 211 mounted upon angular bars 213, 214 of the machine frame. A drive sprocket 215 is drivingly keyed to one end of the shaft 210 and is driven by a chain 216 from a sprocket 217 keyed to the output shaft 218 of an adjustable drive unit 219. The input shaft 220 of the drive unit 219 is driven by a chain and sprocket drive 221 from the main drive shaft 26 of the decorating machine 16 so that rotation of the wheel 203 is synchronized with the drive of the decorating machine and the drive to the let down mechanism of FIGURES 1 through 7.

The adjustable drive unit 219 is a conventional type of adjustable device which facilitates relative angular adjustment between the input shaft 220 and the output shaft 218 of the unit. By rotating a handle 223 of the drive unit, the output shaft 217 may be angularly rotated while the input shaft is restrained against movement so as to angularly adjust the position of the vacuum wheel 200 relative to the drive shaft 26 of the machine and thus relative to the conveyor 15 of the decorating machine.

In order for the bottles to be engaged by the vacuum cups so as to be transported away from the conveyor 15 of the decorating machine 16, each bottle must be moved axially on the conveyor 15 toward the vacuum wheel when the bottle is aligned with the wheel. To this end, a rotatable disc 233 is mounted upon an end of a shaft 234 and is operable to tap or push against the mouth of the bottles when they pass the disc and are axially aligned with a suction cup 204 of the vacuum wheel 200 so as to push the bottles axially into engagement with the cups.

The shaft 234 which supports the rotatable disc 233 is mounted upon the upper end of a vertical support bar 235. At its lower end, this bar is pivotally mounted upon a shaft 236 which is in turn mounted upon the machine frame. To bias the bar 235 away from the bottles on the machine conveyor 15, a stationary vertical bar 237 is fixedly attached at its lower end to a frame member 238 of the machine 16. At its upper end, this stationary bar supports one end of a tension spring 239, the opposite end of which is attached to the pivotally mounted bar 235 so as to pull the upper end of the pivotally mounted bar 235 away from the bottle conveyor 15.

Oscillatory movement is imparted to the bar 235 and thus the attached pusher disc 233 by a rotatable cam wheel 240. This wheel 240 is drivingly keyed to a drive shaft 241 rotatably mounted upon the machine frame member 238. The shaft 241 is driven by a chain and sprocket drive 244 from a shaft 243. This latter shaft 243 is in turn driven from the main drive shaft 26 of the decorating machine through a gear box 245 and a chain and sprocket drive 246. Thus, the drive to the rotatable cam 240 is synchronized with the drive to the decorating machine and to the conveyor 15 of this machine.

Extending radially from the rotatable cam wheel 240 are a plurality of stub shafts which rotatably support rollers 247 for rotation about radii of the cam wheel 240. These rollers are engageable with a damp or cam 248 attached to the oscillatable bar 235 so as to force the cam 248 and thus the upper end of the pivot shaft 235 toward the conveyor 15. As the rollers 247 pass off of the ramp 248, the spring 239 pulls the upper end of the bar 235 rearwardly. Thus, the rotatable cam 240 and its attached rollers 247 cooperate with the ramp or cam 248 to periodically move the bar 235 toward the conveyor 15, and thus move the attached rotatable disc 233 into engagement with the mouths of the bottles as the bottles pass the disc 233.

As may be seen most clearly in FIGURE 9, the axis of the rotatable disc 233 is offset slightly from the axes of the bottles and axes of the suction cups 204 of the vacuum wheel 200 when the disc 233 pushes the bottles into engagement with the cups. This offset permits the disc to rotate upon engagement with the bottle so as to permit the bottle to be moved upwardly while in contact with the disc. In the absence of this rotatable motion of the disc, the disc tends to cock the bottles on the suction cup and in some instances, knock the bottles off of the suction cups.

After engagement with a suction cup 204 of the vacuum wheel 200, the bottle is transported by the wheel through an arc of approximately 90° to a vertical position. When the bottle reaches the vertical position, it enters between a pair of resilient rubber belts 264, 265 of the conveyor 19 which grasp the neck 6 of the bottle beneath the flanged mouth 7 and transport the bottle linearly away from the vacuum wheel out of the machine (see FIGURE 11).

The belt conveyor 19 is supported from a pair of overhead frame beams 250 which are in turn supported by four vertical frame posts 251 from the angle bars 213, 214. A pair of belt supporting channels 252, 253 are suspended from the beams 250 by a pair of bolts 254, 255; the lower ends of the bolts being pivotally connected to crossbar shafts 256 which extend between the channels 252, 253. By tightening or loosening nuts 257 attached to the upper ends of the bolts 254, 255, the beams 252, 253 may be raised and lowered so as to accommodate varying size bottles in the machine.

At the forward or upstream end, the two channels 252, 253 rotatably support an idler pulley shaft 260 which extends between the two. This shaft 260 in turn supports a pair of spaced idler pulleys 261, 262 which are keyed to the shaft. As may be seen most clearly in FIGURES 12 and 13, these pulleys are spaced apart a distance greater than the width of the neck of the bottles so that as the belts 264, 265 pass over the pulleys, they are spaced apart a distance greater than the width of the neck of the bottles. Consequently, bottles may pass upwardly on the vacuum wheel 200 between the pulleys to a position in which the necks 6 of the bottles are located between the two belts.

Spaced rearwardly or downstream from the idler pulleys 261, 262 are a second pair of pinch roll pulleys or half pulleys 266, 267. These pulleys are rotatably mounted upon a shaft 268 which extends between the two channels 252, 253 and is rotatable therein. The spacing between these two pulleys is less than that of the two idler pulleys 261 and 262 so that the pinch roll pulleys 266 and 267 force the two belts transveresly toward one another to beneath the flange or lip 7 of the bottles and against the neck 6. This close spacing of the belts 264, 265 is maintained by a second pair of pinch roll or half pulleys 270 and 271 located downstream from the first pair of pinch roll pulleys 266 and 267. The pulleys 270 and 271 are identical to the pulleys 266 and 267 and are spaced apart the same distance. These pulleys 270, 271 are supported upon a shaft 272 rotatably journalled within the channels 252 and 253.

From the pinch roll pulleys 270, 271, the belts move apart and pass around drive pulleys 275, 276 drivingly keyed to a shaft 277. This latter shaft extends between the two channels 252 and 253 at the downstream end of the channels. From the pulleys 275 and 276 the belts move upwardly over a pair of idler pulleys 279 and 280 rotatably supported upon a vertical bracket 283 attached to the channels.

A chain and sprocket drive 278 drives the belts 264, 265 through the shaft 277. This chain and sprocket drive 278 is driven from the main drive shaft 26 of the decorating machine through a second chain and sprocket drive 285 and a pair of gears 286, 287.

Operation

Bottles 5 are fed in a continuous single file stream into the machine on the infeed platform conveyor 11. While supported on this conveyor, the bottles enter between the two belts 60, 61 of the infeed belt conveyor 13. Moving upstream toward the let down vacuum wheel 14, the belts converage so as to engage the cylindrical sides of the bottles and pinch the bottles therebetween. Prior to engagement of the belts 60, 61 with the bottles, the bottles are spaced apart by entry of the wedges 34 on the spacing conveyor 12 between adjacent bottles. While these wedges 34 are located between the bottles, the belts 60, 61 converge to grasp the bottles and transport them while suspended from the belts, downstream to a position over the vacuum cups 110 of the vacuum wheel 14. Simultaneously with the arrival of a bottle over a cup of the vacuum wheel, the bottle passes out from between the two belts 60, 61 and is tapped or pushed downwardly by the rotatable disc 107. This disc thus moves the bottles downwardly so as to positively engage the bottom of the bottles with the vacuum cups.

Upon engagement of a bottle with a vacuum cup, suction is applied to the cup through the manifold plate 120 and the internal conduits 154, 146 of the wheel 121. This vacuum is maintained while the bottles are transported through a 90° arc downwardly onto the conveyor 15 of the glass bottle decorating machine 16. This latter conveyor 15 then transports the bottles away from the vacuum wheel in a direction parallel to the axis of the wheel 14.

The vacuum wheel 14 rotates continuously at a substantially constant angular velocity and therefore maintains the bottles in motion as they move from the continuously moving belt conveyor 13 downwardly onto the conveyor 15 of the decorating machine 16. In this way, the delay heretofore associated with the slow acceleration of the bottles falling off a conveyor onto a cradle or onto some transporting medium which subsequently moves the bottles into a horizontal position, is avoided.

After having moved through the decorating machine 16 and after having had a decorative pattern applied thereto, the bottles move into axial alignment with a vacuum cup 204 of the pickup wheel 200. Upon axial alignment of a bottle with a cup 204, the mouth 7 of the bottle is engaged by the oscillatable disc 233 which pushes the bottle rearwardly into contact with the suction cup. Just prior to the bottle contacting the cup, a vacuum is applied to the cup through the manifold plate 205 and the internal conduits of the wheel so that the bottle is picked up off this conveyor 15 by the vacuum cup. This vacuum to the cup is maintained as the bottles are rotated upwardly through a 90° arc into the converging mouth of the two belts 264, 265. In converging together, the belts pinch the necks 6 of the bottles therebetween, and while pinched between the resilient belts and suspended therefrom, the bottles are transported by the belts out of the machine.

As the bottles reach the downstream end of the belt conveyor 19, the two belts 264, 265 move apart so as to allow the bottles suspended therefrom to drop onto a platform conveyor (not shown) or other conveyance medium from whence the bottles are transported to a kiln or to the next bottle processing station.

Having described my invention, I claim:

1. In a bottle decorating machine having two conveyors, one of said conveyors being operable to transport bottles in a vertical position with the axes of the bottles located in a vertical plane and the other conveyor being operable to transport bottles while supported in a horizontal position with the axes of the bottles located in a horizontal plane, the improvement which comprises a mechanism for effecting transfer of bottles between said conveyors, said mechanism comprising a rotatable bottle transport wheel which has its axis located in a horizontal plane, means for rotating said wheel in synchronization with the movement of at least one of said conveyors, a plurality of suction cups mounted upon the periphery of said wheel and means for selectively applying a vacuum to each of said suction cups while said cup is engaged with a bottle so as to effect transfer of said bottle on said cup from a first one of said conveyors to a second one of said conveyors, said last named being operable to release said vacuum upon arrival of said bottle at said second conveyor so as to permit said bottle to be removed from said cup onto said second conveyor.

2. The decorating machine of claim 1 which further comprises means for moving each of said bottles axially toward said suction cup prior to transfer of said bottle from said first conveyor to said wheel so as to insure surface contact of said bottom of said bottle with said cup.

3. The decorating machine of claim 2 in which said moving means comprises a reciprocal member movable toward and away from the axis of said wheel in synchronization with the rotatable movement of said wheel.

4. The decorating machine of claim 3 in which the bottle contacting element of said moving means is mounted for movement relative to said reciprocal member.

5. The decorating machine of claim 4 in which the bottle contacting element is a disc rotatably mounted upon said reciprocal member, said disc being positioned relative to said first conveyor so as to engage bottles on said conveyor off center from the axis of said disc.

6. In a bottle decorating machine having two continuously moving conveyors, one of said conveyors being operable to continuously transport bottles in a vertical position with the axes of the bottles located in a vertical plane and the other conveyor being operable to continuously transport said bottles while supported in a horizontal position with the axes of the bottles located in a horizontal plane, the improvement which comprises a mechanism for effecting transfer of bottles between said conveyors, said mechanism comprising a continuously rotating bottle transport wheel which has its axis located in a horizontal plane, means for rotating said wheel in synchronization with the movement of at least one of said conveyors, a plurality of suction cups mounted upon the periphery of said wheel and means for selectively applying a vacuum to each of said suction cups while said cup is engaged with a bottle so as to effect transfer of said bottle on said cup from a first one of said conveyors to a second one of said conveyors, said last named means being operable to release said vacuum upon arrival of said bottle at said second conveyor so as to permit said bottle to be removed from said cup onto said second conveyor.

7. The bottle decorating machine of claim 6 in which said vacuum applying means includes a stationary manifold plate located in juxtaposition to said wheel and cooperable with conduits through said wheel to apply a vacuum to said suction cups.

8. For use in combination with a bottle decorating machine, a mechanism for effecting transfer of bottles between a first and second conveyor of said machine, one of said conveyors being operable to transport said bottles in a vertical position with the axes of the bottles located in a vertical plane and the other conveyor being operable to transport said bottles while supported in a horizontal position with the axes of the bottles located in a horizontal plane, said mechanism comprising a rotatable bottle transport wheel which has its axis located in a horizontal plane, means for rotating said wheel in synchronization with the movement of at least one of said conveyors, a plurality of suction cups mounted upon the periphery of said wheel, and means for selectively applying a vacuum to each of said suction cups while said cup is engaged with a bottle so as to effect transfer of said bottle on said cup from a first one of said conveyors to a second one of said conveyors, said last named means being operable to release said vacuum upon arrival of said bottle at said second conveyor so as to permit said bottle to be removed from said cup onto said second conveyor.

9. In a bottle decorating machine having a continuously movable infeed conveyor and a continuously movable main conveyor, said infeed conveyor being operable to transport bottles in a vertical position with the axes of the bottles located in a vertical plane and the main conveyor being operable to transport said bottles while supported in a horizontal position with the axes of the bottles located in a horizontal plane, the improvement which comprises a mechanism for effecting transfer of bottles between said conveyors, said mechanism comprising a rotatable bottle transport wheel which has its axis located in a horizontal plane, means for continuously rotating said wheel in synchronization with the movement of at least one of said conveyors, a plurality of suction cups mounted upon the periphery of said wheel, and means for selectively applying a vacuum to each of said suction cups while said cup is engaged with a bottle so as to effect transfer of said bottle on said cup from said infeed conveyor to said main conveyor, said last named means being operable to release said vacuum upon arrival of said bottle at said main conveyor so as to permit said bottle to be removed from said cup onto said main conveyor.

10. The bottle decorating machine of claim 9 wherein said infeed conveyor comprises, a pair of continuously moving endless belts, said belts being spaced apart during a portion of their travel a distance less than the diameter of said bottles so as to support and carry said bottles therebetween.

11. The bottle decorating machine of claim 10 which further includes means for spacing said bottles a predetermined distance apart prior to enagagement by said belts, said spacing means including a continuously movable spacing conveyor having spacing wedges insertable between adjacent bottles, said wedges being removed from between said adjacent bottles when said adjacent bottles are engaged by said belts.

12. The decorating machine of claim 11 wherein the insertion and removal of said bottle spacing wedges is controlled by a stationary cam located in the path of travel of said spacing conveyor.

13. In a bottle decorating machine having a continuously movable feed out conveyor and a continuously movable main conveyor, said feed out conveyor being operable to transport bottles in a vertical position with the axes of the bottles located in a vertical plane and the main conveyor being operable to transport said bottles while supported in a horizontal position with the axes of the bottles located in a horizontal plane, the improvement which comprises a mechanism for effecting transfer of bottles from said main conveyor to said feed-out conveyor, said mechanism comprising a rotatable bottle transport wheel which has its axis located in a horizontal plane, means for continuously rotating said wheel in synchronization with the movement of at least one of said conveyors, a plurality of suction cups mounted upon the periphery of said wheel, and means for selectively applying a vacuum to each of said suction cups while said cup is engaged with a bottle so as to effect transfer of said bottle on said cup from said main conveyor to said feed out conveyor, said last named means being operable to release said vacuum upon arrival of said bottle at said feed out conveyor so as to permit said bottle to be removed from said cup onto said feed out conveyor.

14. The bottle decorating machine of claim 13 wherein said feed out conveyor comprises a pair of continuously moving endless belts, said belts being spaced apart during at least one portion of their travel a distance less than the diameter of the necks of said bottles so that said bottles are carried between said belts while supportd from th necks thereof.

15. In a bottle decorating machine having two conveyors, one of said conveyors being operable to transport bottles in a vertical position with the axes of the bottles located in a vertical plane and the other conveyor being operable to transport said bottles while supported in a horizontal position with the axes of the bottles located in a horizontal plane, the improvement which comprises a mechanism for effecting transfer of bottles between said conveyors, said mechanism comprising a rotatable bottle transport wheel which has its axis located in a horizontal plane, means for rotating said wheel in synchronization with the movement of at least one of said conveyors, a plurality of suction applying means mounted upon the periphery of said wheel, and means for selectively connecting a vacuum to each of said suction applying means while said applying means are engaged with a bottle so as to effect transfer of said bottle on said applying means from a first one of said conveyors to a second one of said conveyors, said connecting means being operable to release said vacuum upon arrival of said bottle at said second conveyor so as to permit said bottle to be removed from said applying means onto said second conveyor.

References Cited

UNITED STATES PATENTS 1,574,430  2/1926  Lemon _____ 198—25 X

EDWARD A. SROKA, *Primary Examiner.*

U.S. Cl. X.R.

198—25, 34, 165